(12) United States Patent
Kim et al.

(10) Patent No.: US 11,715,853 B2
(45) Date of Patent: *Aug. 1, 2023

(54) BATTERY CELL MOUNTING APPARATUS AND METHOD THEREFOR

(71) Applicant: LG Energy Solution, Ltd., Seoul (KR)

(72) Inventors: Kyung-Mo Kim, Daejeon (KR); Jeong-O Mun, Daejeon (KR); Ho-June Chi, Daejeon (KR)

(73) Assignee: LG Energy Solution, Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/835,486

(22) Filed: Jun. 8, 2022

(65) Prior Publication Data

US 2022/0302536 A1     Sep. 22, 2022

Related U.S. Application Data

(63) Continuation of application No. 16/765,611, filed as application No. PCT/KR2019/002243 on Feb. 22, 2019, now Pat. No. 11,394,075.

(30) Foreign Application Priority Data

May 30, 2018 (KR) .................. 10-2018-0061626

(51) Int. Cl.
*H01M 50/103* (2021.01)
*H01M 50/204* (2021.01)
(Continued)

(52) U.S. Cl.
CPC ....... *H01M 50/103* (2021.01); *H01M 50/204* (2021.01); *H01M 50/211* (2021.01);
(Continued)

(58) Field of Classification Search
CPC .. H01M 50/20; H01M 50/116; H01M 50/244; B29C 66/83431
See application file for complete search history.

(56) References Cited

U.S. PATENT DOCUMENTS

| 2008/0294283 A1 | 11/2008 | Ligrano |
| 2013/0059179 A1* | 3/2013 | Hosaka ................ H01M 50/10 |
| | | 429/61 |

(Continued)

FOREIGN PATENT DOCUMENTS

| CN | 105314148 A | 2/2016 |
| DE | 102015202340 A1 | 8/2016 |

(Continued)

OTHER PUBLICATIONS

Extended European Search Report for Application No. 19812103.0 dated Mar. 11, 2021, pp. 1-5.

(Continued)

*Primary Examiner* — Adam A Arciero
(74) *Attorney, Agent, or Firm* — Lerner David LLP

(57) ABSTRACT

An apparatus mounts a battery cell stack to a frame that includes a base cover and a pair of side covers respectively extending from both ends of the base cover. The apparatus includes a support member to support the battery cell stack, and two films, wherein one side of each of the two films is respectively attachable to one of the pair of side covers of the frame, and another side of each of the two films is respectively attachable to one of two side surfaces of the battery cell stack, wherein, when the support member and the frame move toward each other, the two films are movable into the frame, and the battery cell stack is movable along the two films to be mounted to the frame.

13 Claims, 6 Drawing Sheets

(51) Int. Cl.
  *H01M 50/244* (2021.01)
  *H01M 50/211* (2021.01)
  *B29C 65/00* (2006.01)

(52) U.S. Cl.
  CPC ..... *H01M 50/244* (2021.01); *B29C 66/83431* (2013.01); *Y02P 70/50* (2015.11)

(56) References Cited

U.S. PATENT DOCUMENTS

| | | | |
|---|---|---|---|
| 2013/0140099 | A1 | 6/2013 | Ojima et al. |
| 2016/0031574 | A1 | 2/2016 | Razzaboni et al. |
| 2016/0368464 | A1 | 12/2016 | Hassounah |
| 2017/0047571 | A1 | 2/2017 | Iwasaki et al. |
| 2017/0324071 | A1* | 11/2017 | Hirose ................ H01M 50/20 |
| 2019/0319225 | A1* | 10/2019 | Kang .................... H01M 50/10 |

FOREIGN PATENT DOCUMENTS

| | | | |
|---|---|---|---|
| JP | 2012248484 | A | 12/2012 |
| JP | 2013098140 | A | 5/2013 |
| JP | 5469569 | B2 | 4/2014 |
| JP | 5623342 | B2 | 11/2014 |
| JP | 2016096106 | A | 5/2016 |
| JP | 2017168285 | A | 9/2017 |
| JP | 2018049803 | A | 3/2018 |
| KR | 20120106088 | A | 9/2012 |
| KR | 20140087780 | A | 7/2014 |
| KR | 20150049768 | A | 5/2015 |
| KR | 20150102226 | A | 9/2015 |
| KR | 20160049866 | A | 5/2016 |
| KR | 20160143903 | A | 12/2016 |
| KR | 20160146697 | A | 12/2016 |
| KR | 20170004028 | U | 11/2017 |
| TW | 201517719 | A | 5/2015 |
| WO | 2012093790 | A2 | 7/2012 |

OTHER PUBLICATIONS

International Search Report for Application PCT/KR2019/002243 dated Jun. 7, 2019, 3 pages.
Search Report dated Jan. 13, 2022 from the Office Action for Chinese Application No. 201980004495.6 dated Jan. 19, 2022, 2 pages.

* cited by examiner (a)

(b)

BATTERY CELL MOUNTING APPARATUS AND METHOD THEREFOR

CROSS-REFERENCE TO RELATED APPLICATIONS

The present application is a continuation of U.S. patent application Ser. No. 16/765,611, filed on May 20, 2020, which is a national phase entry under 35 U.S.C. § 371 of International Application No. PCT/KR2019/002243, filed Feb. 22, 2019, published in Korean, which claims priority to Korean Patent Application No. 10-2018-0061626 filed on May 30, 2018 in the Republic of Korea, the disclosures of which are incorporated herein by reference.

TECHNICAL FIELD

The present disclosure relates to an apparatus and method for mounting a battery cell, and more particularly, to an apparatus and method for mounting a battery cell, which allows a battery cell stack to be mounted to a frame without deforming the frame.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, a separator interposed therebetween, and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

In a secondary battery, a battery cell stack may be mounted to frames of various shapes. Here, if the frame has a U shape, it is not easy to mount the battery cell stack to the frame.

FIGS. 1 (a) and 1 (b) are diagrams for illustrating a method of inserting a battery cell stack into a U-shaped frame.

Referring to FIG. 1 (a), an inner length L1 of the U-shaped frame 1 is identical or extremely similar to an entire length L2 of a battery cell stack 2, and namely, there is substantially no clearance. Here, the battery cell stack 2 is inserted into the U-shaped frame 1 in a state where a side cover 4 of the frame 1 is deformed to spread outward by applying an external force to the side cover 4 of the U-shaped frame 1 outward. However, in this method, the U-shaped frame 1 may be permanently deformed, and the U-shaped frame 1 may be distorted.

Referring to FIG. 1 (b), since the inner length L1 of the U-shaped frame 1 is longer than the entire length L2 of the battery cell stack 2, a predetermined space 5 is formed between the U-shaped frame 1 and the battery cell stack 2. By doing so, the battery cell stack 2 may be easily mounted to the U-shaped frame 1. However, due to the space 5 between the U-shaped frame 1 and the battery cell stack 2, it is not easy to fix the battery cell stack 2 to the U-shaped frame 1, and the space utilization of the battery module is low since the total volume of the battery module increases.

DISCLOSURE

Technical Problem

The present disclosure is designed to solve the problems of the related art, and therefore the present disclosure is directed to providing an apparatus and method for mounting a battery cell, which may allow a battery cell stack to be mounted to a frame without deforming or distorting the frame.

Also, the present disclosure is directed to providing an apparatus and method for mounting a battery cell, which may prevent the space utilization of the battery from deteriorating.

In addition, the present disclosure is directed to providing an apparatus and method for mounting a battery cell, which may allow the battery cell stack to be mounted to the frame without damaging the battery cell stack.

Technical Solution

In one aspect of the present disclosure, there is provided an apparatus for mounting a battery cell, which mounts a battery cell stack to a frame that includes a base cover and a pair of side covers respectively extending from both ends of the base cover, the apparatus comprising: a support member to support the battery cell stack, and two films, wherein one side of each of the two films is respectively attachable to one of the pair of side covers of the frame, and another side of each of the two films is respectively attachable to one of a two side surfaces of the battery cell stack, wherein, when the support member and the frame move toward each other, the two films are movable into the frame, and the battery cell stack is movable along the two films to be mounted to the frame.

Also, the apparatus for mounting a battery cell may further comprise a pressing member configured to move toward the support member at a position spaced apart from the support member to press one of the two side surfaces of the battery cell stack.

In addition, the pressing member may include: a movable rod; at least one rotating roller coupled to the movable rod and configured to contact one of the two films at one of the side surfaces of the battery cell stack; and a driving force transmission source coupled to the movable rod to transmit a driving force to the movable rod.

Also, the two films may be insulation films.

In addition, the apparatus for mounting a battery cell may further comprise a double-sided tape by which each of the two films may be attachable to the frame or the battery cell stack.

Also, the apparatus for mounting a battery cell may further comprise a push member configured to push the frame toward the support member.

In addition, the apparatus for mounting a battery cell may further comprise a heat conduction member couplable to the battery cell stack.

Meanwhile, in another aspect of the present disclosure, there is also provided a method for mounting a battery cell, which mounts a battery cell stack to a frame that includes a base cover and a pair of side covers respectively extending from both ends of the base cover, the method comprising: attaching one side of each of two films respectively to one of the pair of side covers of the frame; attaching another side of each of the two films respectively to one of two side surfaces of the battery cell stack; moving a support member supporting the battery cell stack and the frame toward each other; and moving the battery cell stack along the two films to be inserted into the frame.

Also, the method may further comprise moving a pressing member toward the support member at a position spaced apart from the support member to press one of the two side surfaces of the battery cell stack.

Advantageous Effects

In embodiments of the present disclosure, since the battery cell stack is mounted to the frame along a film, the battery cell stack may be mounted to the frame without deforming or distorting the frame.

Also, since no space is formed between the frame and the battery cell stack, it is possible to prevent the space utilization of the battery from deteriorating.

In addition, since the battery cell stack is inserted into the frame while sliding along the film, the battery cell stack may be mounted to the frame without being damaged.

BEST MODE

Figure 1:
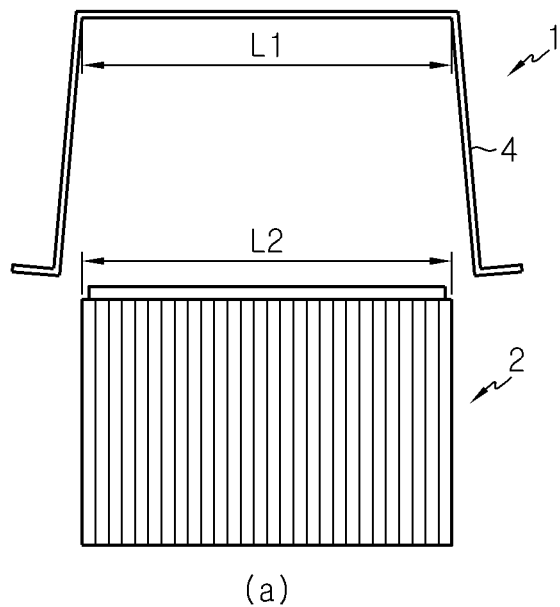
FIGS. 1 (*a*) and 1 (*b*) are diagrams for illustrating a method of inserting a battery cell stack into a U-shaped frame.
Figure 1:
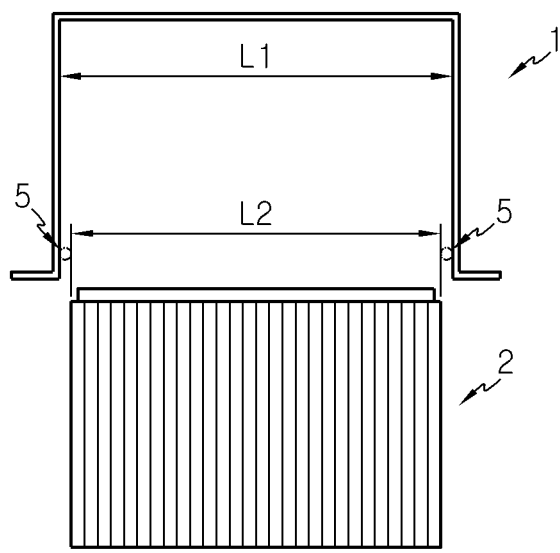

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
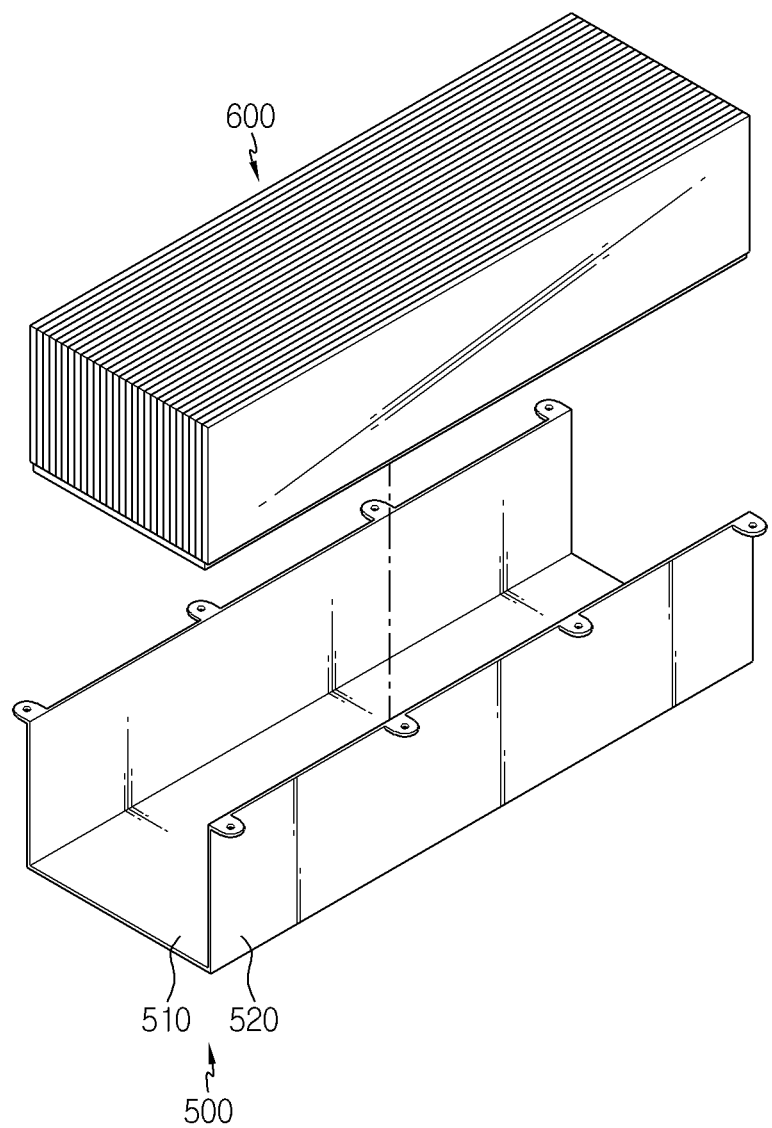
FIG. 2 is a schematic perspective view showing that a battery cell stack is separated from a frame.
Figure 3:
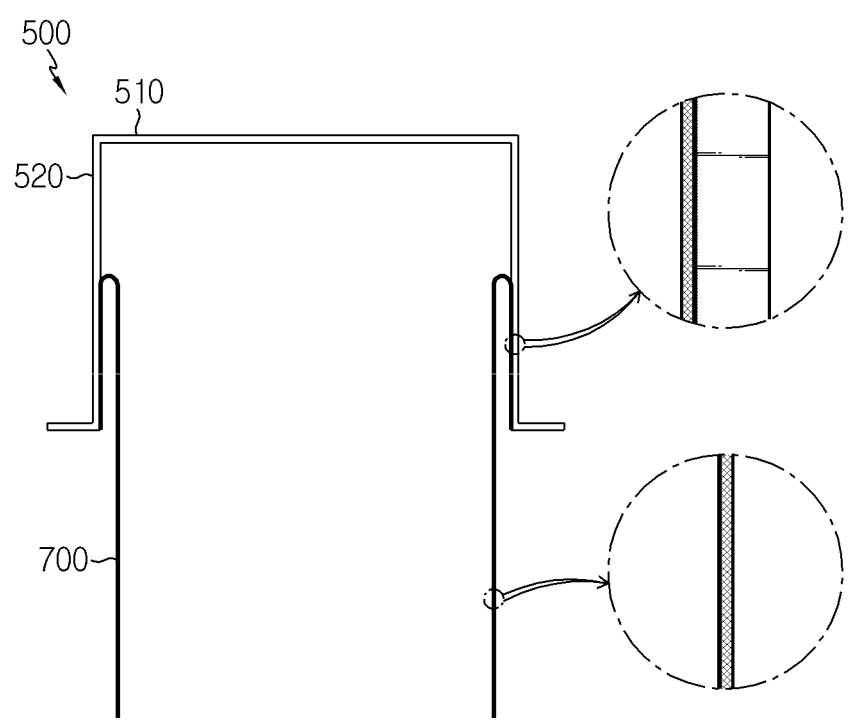
FIG. 3 is a schematic side view showing that a film is attached to the frame.
Figure 4:
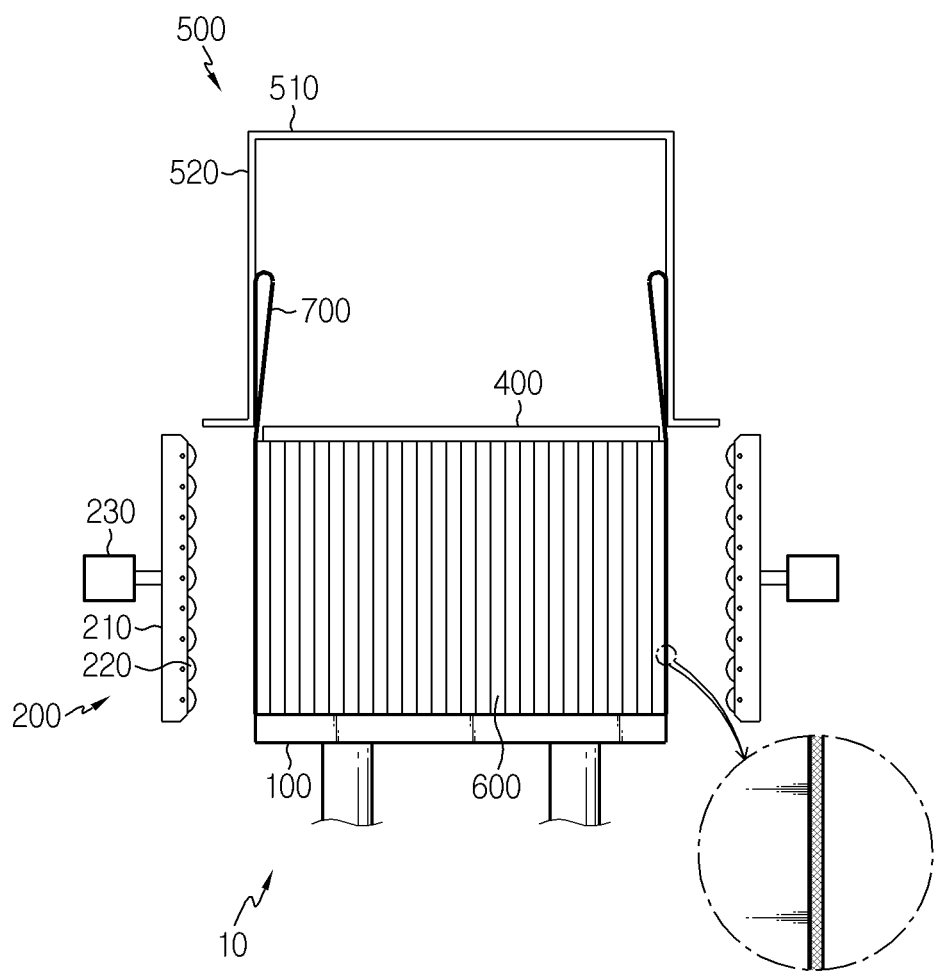
FIG. 4 is a schematic side view showing the apparatus for mounting a battery cell according to an embodiment of the present disclosure.

FIG. 2 is a schematic perspective view showing that a battery cell stack is separated from a frame, FIG. 3 is a schematic side view showing that a film is attached to the frame, and FIG. 4 is a schematic side view showing the apparatus for mounting a battery cell according to an embodiment of the present disclosure.

In this specification, a battery cell stack 600 may be mounted to a frame 500 to form a battery module. The frame 500 may have various shapes, and for convenience of explanation, as shown in FIG. 2, the frame 500 will be described as including a base cover 510 and a pair of side covers 520 extending from both ends of the base cover 510. For example, the frame 500 may be formed to have an approximate "U" shape. Here, the approximate "U" shape does not necessarily have to be the same as the "U" shape but includes all shapes similar to the "U" shape.

Referring to FIG. 4, an apparatus 10 for mounting a battery cell according to an embodiment of the present disclosure includes a support member 100. Also, one side of the film 700 is attached to the frame 500, and the other side of the film 700 is attached to the battery cell stack 600.

The support member 100 supports the battery cell stack 600. That is, referring to FIG. 4, the battery cell stack 600 may be placed on and supported by an upper side of the support member 100. Here, the battery cell stack 600 may be prepared by coupling a plurality of battery cells in various ways. For example, a plurality of battery cells may be attached to each other by a double-sided tape to form the battery cell stack 600, and the battery cell stack 600 configured as above is placed on an upper side of the support member 100 based on FIG. 4. The support member 100 may move close to the frame 500. That is, the support member 100 may move toward the frame 500 in a state where the battery cell stack 600 is placed thereon, or the frame 500 may move toward the support member 100. In this regard, a predetermined power source may be coupled to the support member 100 to move the support member 100 toward the frame 500. Alternatively, the support member 100 may be fixed and the frame 500 may be moved to the support member 100. However, for convenience of explanation, the following description will be based on the case where the support member 100 moves toward the frame 500.

Meanwhile, referring to FIG. 3, one side of each of two films 700 is respectively attached to one of the pair of side covers 520 of the frame 500. Here, the film 700 may be attached to the side cover 520 of the frame 500 in various ways. For example, the film 700 may be attached to the side cover 520 by using a double-sided tape. However, the method of attaching the film 700 is not limited thereto. Also, referring to FIG. 4, the other side of each of the two films 700 is respectively attached to one of two side surfaces of the battery cell stack 600.

As described above, the film 700 may be attached to the battery cell stack 600 in various ways and, for example, the film 700 may be attached to the battery cell stack 600 by using a double-sided tape. However, the method of attaching the film 700 is not limited thereto. That is, one side of the film 700 is attached to the side cover 520 of the frame 500, and the other side of the film 700 is attached to the side surface of the battery cell stack 600.

If the support member 100 moves toward the frame 500 in a state where the film 700 is respectively attached to the side cover 520 of the frame 500 and the battery cell stack 600, for example if the support member 100 moves upward based on FIG. 4, the film 700 is also moved into the frame 500. In addition, the battery cell stack 600 may move along the film 700 to be mounted to the frame 500. That is, since the battery cell stack 600 is smoothly inserted into the frame 500 while sliding along the film 700 having a low coefficient of friction, the battery cell stack 600 may be mounted to the frame 500 without being damaged.

Here, the film 700 may be provided as an insulation film 700. As explained later, after the film 700 is inserted into the frame 500 together with the battery cell stack 600, the film 700 remains in the frame 500 in contact with the battery cell stack 600 without being removed. In addition, since the film 700 is provided as the insulation film 700 and remains inside the frame 500, it is not necessary to separately perform insulation coating on the side cover 520 of the frame 500. Accordingly, the insulation coating process of the frame 500 is excluded, thereby shortening the overall process time and reducing the cost.

The pressing member 200 moves toward the support member 100 at a position spaced apart from the support member 100 to press a side surface of the battery cell stack 600 to which the other side of the film 700 is attached. That is, the pressing member 200 presses the side surface of the battery cell stack 600 so that the battery cell stack 600 is smoothly inserted into the frame 500.

The pressing member 200 may include a movable rod 210, a rotating roller 220 and a driving force transmission source 230. The movable rod 210 contacts the side surface of the battery cell stack 600 via roller 220 and presses the battery cell stack 600 (see FIG. 5). To this end, the movable rod 210 may have a height corresponding to the height of the battery cell stack 600 based on the direction in which the battery cell stack 600 is supported by the support member 100. That is, the movable rod 210 may be provided to have a length equal to the height of the battery cell stack 600, without being limited thereto. In addition, the movable rod 210 is provided to be movable toward the battery cell stack 600 at a position spaced apart from the battery cell stack 600. At least one rotating roller 220 is provided to be coupled to the movable rod 210. In addition, at the side surface of the battery cell stack 600, the rotating roller 220 contacts the film 700 attached to the side surface of the battery cell stack 600. In addition, if the support member 100 moves toward the frame 500 in a state where the film 700 and the battery cell stack 600 are pressed by the pressing member 200, the battery cell stack 600 and the film 700 also move toward the frame 500, and the rotating roller 220 is rotated in association with the movement of the film 700. By doing so, the frictional force between the pressing member 200 and the film 70 may be relaxed. The driving force transmission source 230 is coupled to the movable rod 210 to transmit a driving force to the movable rod 210. The movable rod 210 may be moved toward the battery cell stack 600 or away from the battery cell stack 600 by the driving force transmitted from the driving force transmission source 230. Here, the driving force transmission source 230 may be provided in various ways and may include various motors or cylinders, for example.

The push member 300 may employ various jigs, mechanisms or devices that are adapted to push the frame 500 toward the support member 100 to provide a pressure to the frame 500. The push member 300, for example, contacts and presses the base cover 510 of the frame 500 (see FIG. 6). That is, if the battery cell stack 600 placed on the support member 100 is moved to the frame 500 so that the battery cell stack 600 is inserted into the frame 500, the push member 300 presses the frame 500 to fully mount the battery cell stack 600 to the frame 500. For example, if the battery cell stack 600 moves toward the frame 500 in a state of being placed on the support member 100 so that the battery cell stack 600 is inserted into the frame 500, the push member 300 pushes the base cover 510 of the frame 500 so that the battery cell stack 600 is fully mounted to the frame 500.

A heat conduction member 400 may be coupled to the battery cell stack 600. Referring to FIG. 4, for example, the heat conduction member 400 may be coupled to the upper side of the battery cell stack 600 based on FIG. 4. If heat conduction member 400 is mounted to the battery cell stack 600, the heat conduction member 400 may be interposed between the frame 500 and the battery cell stack 600. That is, since there is no need to separately mount the heat conduction member 400, the assembling work becomes easy and the assembling process is simplified. Here, the heat conduction member 400 may include various members capable of discharging the heat generated at the battery cell stack 600, and includes various heat dissipating members.

Figure 5:
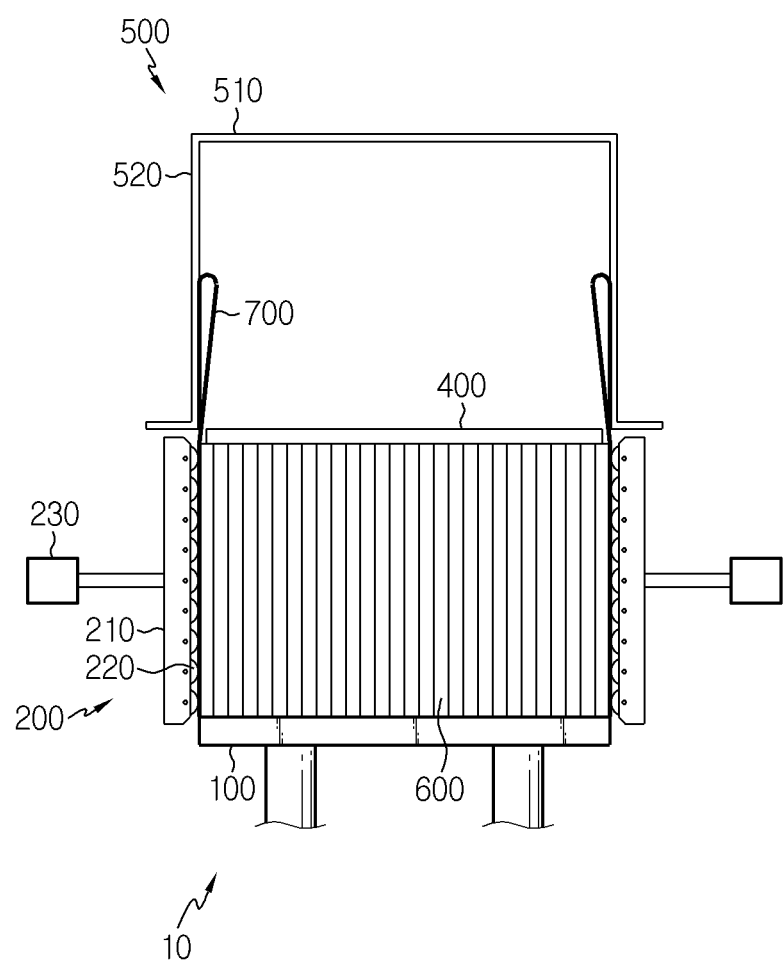
FIGS. 5 and 6 are diagrams for illustrating a process of mounting the battery cell stack to the frame by the apparatus for mounting a battery cell according to an embodiment of the present disclosure.
Figure 6:
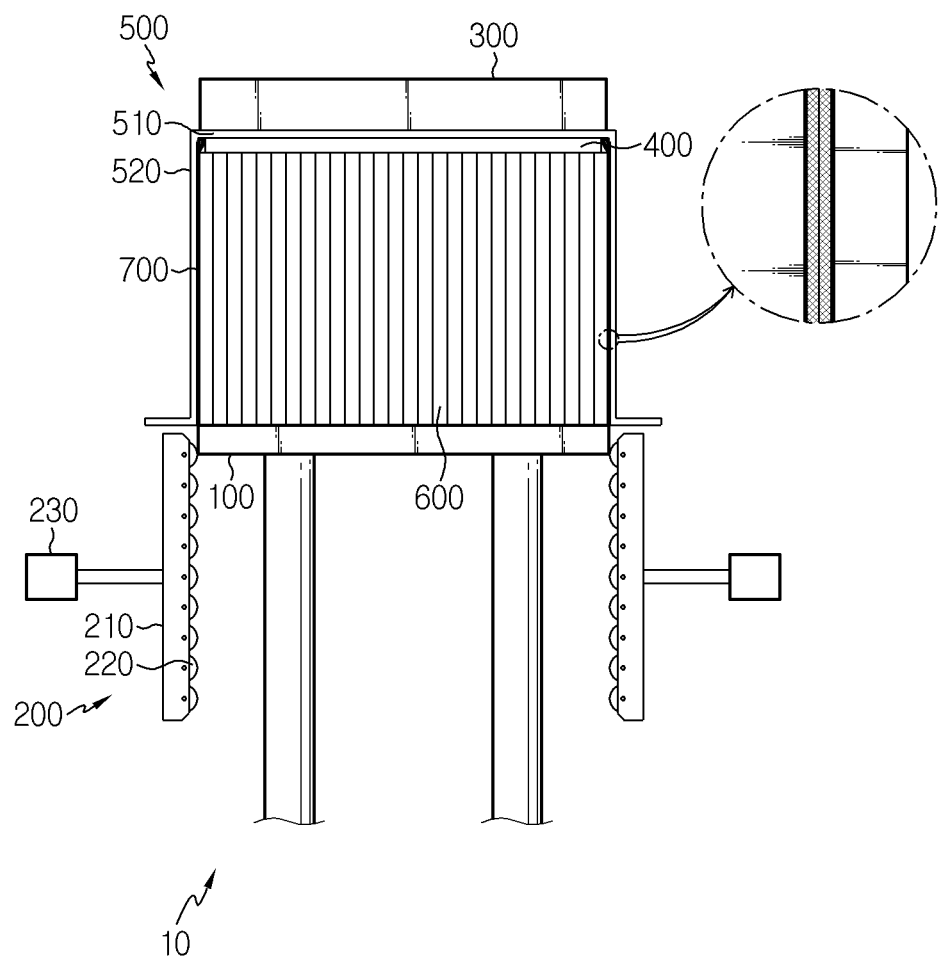

FIGS. 5 and 6 are diagrams for illustrating a process of mounting the battery cell stack to the frame by the apparatus for mounting a battery cell according to an embodiment of the present disclosure.

Hereinafter, a method for mounting a battery cell according an embodiment of the present disclosure will be described with reference to the figures.

As described above, the frame 500 to which the battery cell stack 600 is mounted will be described as including a base cover 510 and a pair of side covers 520 respectively extending from both ends of the base cover 510.

First, referring to FIG. 3, one side of each of the two films 700 is respectively attached to one of the pair of side covers 520 of the frame 500. That is, two films 700 are attached to the pair of side covers 520, respectively. Here, the film 700 may be attached in various ways, and for example, the film 700 may be attached to the side cover 520 by using a double-sided tape.

Next, referring to FIG. 4, the battery cell stack 600 is placed on and supported by the upper side of the support member 100. Here, the support member 100 is provided to be movable toward the frame 500.

Next, referring to FIG. 4, the other side of each of the two films 700 attached to the frame 500 is respectively attached to one of two side surfaces of the battery cell stack 600. Thus, one side of the film 700 is attached to the side cover 520 of the frame 500, and the other side of the film 700 is attached to the battery cell stack 600.

Next, referring to FIG. 5, the movable rod 210 coupled to the driving force transmission source 230 of the pressing member 200 moves toward the support member 100 at a position spaced apart from the support member 100, so that the rotating roller 220 of the pressing member 200 presses the side surface of the battery cell stack 600 to which the other side of the film 700 is attached. Since the pressing member 200 presses the side surface of the battery cell stack 600, the battery cell stack 600 may be smoothly inserted into the frame 500.

Next, referring to FIG. 6, the support member 100 and the frame 500 move close to each other. That is, the support member 100 moves toward the frame 500.

Next, referring to FIG. 6, the battery cell stack 600 moves along the film 700 and is inserted into the frame 500. Here, the push member 300 contacts the base cover 510 of the frame 500 and presses the frame 500 so that the battery cell stack 600 is fully mounted inside the frame 500.

Meanwhile, the film 700 is interposed between the side cover 520 of the frame 500 and the battery cell stack 600 in a state of being attached to the side cover 520 of the frame 500 and the battery cell stack 600, and the film 700 is not removed even after the battery cell stack 600 is mounted to the frame 500. Here, since the film 700 may be provided as the insulation film 700, it is not necessary to separately perform insulation coating or the like on the side cover 520 of the frame 500.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to apparatus and method for mounting a battery cell and is particularly applicable to an industry related to a secondary battery.

What is claimed is:

1. An apparatus for mounting a battery cell, which mounts a battery cell stack to a frame that includes a base cover and a pair of side covers respectively extending from both ends of the base cover, the apparatus comprising:
   a support member to support the battery cell stack, and
   a film, wherein one side of the film is attachable to one of the pair of side covers of the frame, and another side of the film is attachable to one of two side surfaces of the battery cell stack,
   wherein, when the support member and the frame move toward each other, the film is movable into the frame, and the battery cell stack is movable along the film to be mounted to the frame.

2. The apparatus for mounting a battery cell according to claim 1, further comprising:
   a pressing member configured to move toward the support member at a position spaced apart from the support member to press one of the two side surfaces of the battery cell stack.

3. The apparatus for mounting a battery cell according to claim 2,
   wherein the pressing member includes:
   a movable rod;
   at least one rotating roller coupled to the movable rod and configured to contact the film at one of the side surfaces of the battery cell stack; and
   a driving force transmission source coupled to the movable rod to transmit a driving force to the movable rod.

4. The apparatus for mounting a battery cell according to claim 1,
   wherein the film is an insulation film.

5. The apparatus for mounting a battery cell according to claim 1, further comprising:
   a double-sided tape by which the film is attachable to the frame or the battery cell stack.

6. The apparatus for mounting a battery cell according to claim 1, further comprising:
   a push member configured to push the frame toward the support member.

7. The apparatus for mounting a battery cell according to claim 1, further comprising:
   a heat conduction member couplable to the battery cell stack.

8. The apparatus for mounting a battery cell according to claim 1, further comprising:
   two pressing members on respective sides of the battery cell stack and configured to move toward the support member to press the two side surfaces, respectively, of the battery cell stack.

9. A method for mounting a battery cell, which mounts a battery cell stack to a frame that includes a base cover and a pair of side covers respectively extending from both ends of the base cover, the method comprising:
   attaching one side of a film to one of the pair of side covers of the frame;
   attaching another side of the film to one of two side surfaces of the battery cell stack;
   moving a support member supporting the battery cell stack and the frame toward each other; and
   moving the battery cell stack along the film to be inserted into the frame.

10. The method for mounting a battery cell according to claim 9, further comprising:
    moving a pressing member toward the support member at a position spaced apart from the support member to press one of the two side surfaces of the battery cell stack.

11. The method for mounting a battery cell according to claim 9, further comprising:
    attaching the film to the frame or the battery cell stack with a double-sided tape.

12. The method for mounting a battery cell according to claim 9, further comprising:
    moving a push member to push the frame toward the support member.

13. The method for mounting a battery cell according to claim 9, further comprising:
    moving two pressing members on respective sides of the battery cell stack toward the support member to press the two side surfaces, respectively, of the battery cell stack.

* * * * *